United States Patent [19]
Iida

[11] 4,231,646
[45] Nov. 4, 1980

[54] CAMERA WHICH PERMITS AUTOMATIC FOCUSING AND MANUAL FOCUSING

[75] Inventor: Yozo Iida, Komae, Japan

[73] Assignee: Nippon Kogaku K.K., Tokoyo, Japan

[21] Appl. No.: 7,627

[22] Filed: Jan. 29, 1979

[30] Foreign Application Priority Data

Jan. 31, 1978 [JP] Japan ............................ 53-8798

[51] Int. Cl.² .................................................... G03B 3/00
[52] U.S. Cl. ................................................... 354/195
[58] Field of Search ................................. 354/25, 195

[56] References Cited
U.S. PATENT DOCUMENTS

| | | | |
|---|---|---|---|
| 3,871,756 | 3/1975 | Steiringer et al. | 354/25 |
| 4,083,057 | 4/1978 | Quinn | 354/195 |
| 4,110,769 | 8/1978 | Schutz et al. | 354/195 |
| 4,153,903 | 5/1979 | Pizzuti et al. | 354/195 |

Primary Examiner—L. T. Hix
Assistant Examiner—William B. Perkey
Attorney, Agent, or Firm—Fitzpatrick, Cella, Harper & Scinto

[57] ABSTRACT

A camera which permits automatic focusing and manual focusing comprising an objective lens structure, an automatically focusing device, and actuating means. The objective lens structure includes a focusing lens system, a focusing lens system supporting member, biasing means for biasing the supporting member in one direction of the optic axis of the lens system, and an extraneously operable, manually focusing operating member for moving the supporting member in said one direction through the biasing means and for directly moving the supporting member in the opposite direction. The actuating means is used for moving the supporting member in the direction of the optic axis against the biasing force of the biasing means by the output of the automatically focusing device, independently of the manually focusing operating member.

9 Claims, 5 Drawing Figures ial focusing ring (distance ring) 5 having a distance scale 6 and an automatic focus position mark AF formed on the outer periphery thereof an opposed to a fixed index mark 2 is formed integrally with the double helicoid ring 3.

CAMERA WHICH PERMITS AUTOMATIC FOCUSING AND MANUAL FOCUSING

BACKGROUND OF THE INVENTION

1. Field of the Invention

This invention relates to a camera which permits the focusing operation to be accomplished manually and also to be accomplished by an automatically focusing device.

2. Description of the Prior Art

Cameras having mounted thereon a conventional automatically focusing device could effect automatically focusing operation but could not effect manually focusing operation and therefore could not accomplished accurated focusing depending on the conditions of the object to be photographed and accordingly, could not help being used under narrowed photographing conditions. A device has been proposed which permits selection of manually and automatically focusing operations to overcome the above-noted problem. According to such device, during the automatic focusing, an externally accesible, manually focusing operating member was directly driven by the output member of the automatically focusing device and during the manual focusing, the operative association between the manually focusing operating member and the output member was cut off to enable the manual focusing to be accomplished. This has led to complication and large size of the interlocking mechanism between the manually focusing operating member and the output member, and the output member exposed out of the lens tube has resulted in poor portability and higher cost of the camera.

SUMMARY OF THE INVENTION

The present invention has, for its object, to provide a camera which permits the focusing to be accomplished manually and also by the output of an automatically focusing device through a very simple construction.

The invention will become more fully apparent from the following detailed description thereof taken in conjunction with the accompanying drawings.

DESCRIPTION OF THE PREFERRED EMBODIMENTS

Figure 1:
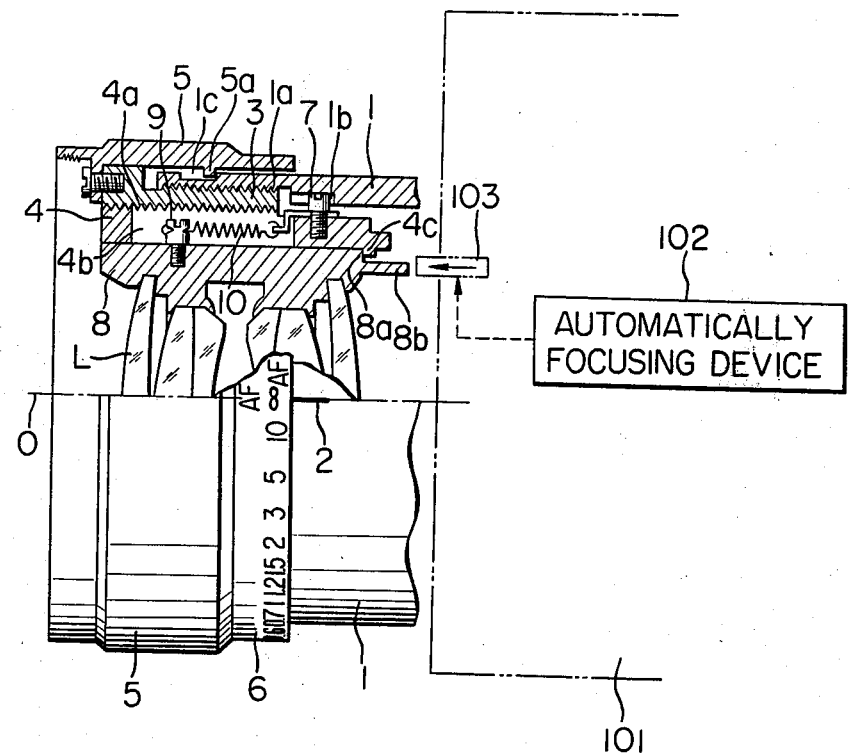
FIG. 1 is a partial cross-sectional view of a first embodiment of the present invention.

Referring to FIG. 1, it shows an embodiment of the present invention. The fixing portion 1 of an objective lens structure is provided with a helicoid 1a in the left inner periphery thereof, and the unshown right end thereof is directly fixed to a camera body 101 or removably coupled to the camera body 101. A fixed index mark 2 is provided in the outer periphery of the fixing portion 1, and a first translation guide groove 1b extending in the direction of the optic axis 0 of a lens L is formed in the inner periphery of the fixing portion 1.

The helicoid on the outer periphery of a double helicoid ring 3 meshes with the helicoid 1a on the fixing portion 1 while the helicoid on the inner periphery thereof meshes with a helicoid 4a provided in the outer periphery of a manually focusing adjust ring 4. A manu- A groove 1c formed circumferentially of the fixing portion 1 and a projection 5a formed on the manually focusing ring 5 together constitute a limit for movement of the manually focusing ring 5 in the direction of the optic axis.

A first guide pin 7 having the head thereof fitted in the first translation guide groove 1b is secured to the outer periphery of the manually focusing adjust ring 4, and a second translation guide groove 4b extending in the direction of the optic axis of the lens L is formed in said outer periphery. This manually focusing adjust ring 4 has a manually focusing interlocking projection 4c at the right-hand end thereof.

A lens supporting member 8 for supporting the lens L movable in the direction of the optic axis for the focusing is slidably supported on the inner periphery of the manually focusing adjust ring 4 and has a stepped portion 8a and an automatically focusing interlocking projection 8b at the right-hand end thereof, the stepped portion 8a being engageable with the manually focusing interlocking projection 4c. A second guide pin 9 fitted in the second translation guide groove 4b is secured to the outer periphery of the lens supporting means 8. A spring 10 is stretched between the first 7 and the second guide pin 10 and biases the lens supporting member 8 so that the manually focusing interlocking projection 4c becomes engaged with the stepped portion 8a.

Description will now be made of the camera body 101 side. An automatically focusing device 102 produces an output corresponding to the distance from the camera to an object to be photographed and may be of any known type. The output thereof controls the position of an actuating member 103. The actuating member 103 bears against the automatically focusing interlocking projection 8b of the lens supporting member 8.

Now, in the case of manually focusing operation, the manually focusing ring 5 is turned so that a desired division of the distance scale 6 is opposed to the fixed index mark 2. By this, the double helicoid ring 3 is rotated and the manually focusing adjust ring 4 is caused to slide in the direction of the optic axis by the first guide pin 7 being guided by the first translation guide groove 1b. As the manually focusing adjust ring 4 slides leftwardly in FIG. 1, the projection 4c engages the stepped portion 8a to cause the lens supporting member 8 also to slide leftwardly. Thus, the focus position is offset toward the closeup distance side. Also, when the adjust ring 4 slides rightwardly, the lens supporting member 8 is caused to slide rightwardly by the action of the spring 10. Thus, the adjust ring 4 and the lens supporting member 8 slide to the left and right in response to the rotation of the operating ring 5, thereby accomplishing the manual focusing.

Here, the amount of sliding movement of the adjust ring 4 is determined by the amount over which the first guide pin 7 can move in the first translation guide groove 1b, and it covers the distance from infinity of the lens to the shortest photographing distance.

Next, in the case of automatically focusing operation, the automatic focus position mark AF of the operating ring 5 is brought into opposed relationship with the fixed index mark 2. Such condition is shown in FIG. 1, where in the first guide pin 7 is positioned at the right-hand end of the first translation guide groove 1b and the second guide pin 9 is positioned at a distance from the left end of the second translation guide groove 4b corresponding to the amount of movement of the guide pin 7 or more. This distance enables movement of the lens supporting member 8 itself in an amount corresponding to form the infinity to the shortest photographing distance during the automatic focusing.

In such a condition as shown in FIG. 1, the automatically focusing interlocking projection 8b comes to bear against the actuating member 103.

Thereafter, if, for example, an unshown shutter release button is depressed, the automatically focusing device 102 is actuated to leftwardly move the actuating member 103 by a predetermined amount and leftwardly move the lens supporting member 8 against the force of the spring 10. When the lens supporting member 8 is moved by an amount corresponding to the photographing distance detected by the automatically focusing device 102, the actuating member 103 is restrained and as the result, the automatic focusing is accomplished. Thereafter, shutter release may take place.

In the above-described embodiment, the lens L lying at the right end position, namely, at the position whereat the lens is focused to an object at infinity, is moved leftwardly in accordance with the output of the automatically focusing device 102, but the following may alternatively be adopted.

That is, the actuating member 103 is associated, for example, with the film winding operation and is leftwardly moved in advance to move the lens supporting member 8 to the shortest photographing position corresponding to the shortest photographing distance against the force of the spring 10 and restrain the lens supporting member 8 thereat, whereafter the restraint is released by operation of the shutter release button to cause the lens supporting member 8 to be rightwardly slidden by the spring 10 and the actuating member 103 is again stopped at a predetermined position by the output of the automatically focusing device 102, thereby accomplishing the automatic focusing.

In such a case where the lens supporting member 8 is restrained in advance at the shortest photographing position against the force of the spring 10 before the focusing operation by the automatically focusing device is initiated, and if the output of the automatically focusing device is related to the shortest photographing distance, the actuating member 103 must be stopped simultaneously with the release of the aforementioned restraint, but this will encounter difficulties. It is therefore advisable to enable the lens supporting member 8 to be positioned further leftwardly of the shortest photographing position and restrain the same at such position in advance.

In the case as shown in FIG. 1 wherein the lens supporting member 8 is moved leftwardly from the infinity position corresponding to the infinity photographing distance by the actuating member 103 in accordance with the output of the automatically focusing device, it is advisable to enable the supporting member 8 to be positioned further rightwardly of the infinity position in the same manner as described.

Description will now be made of a case where the automatic focus position mark AF is purposely not registered to the fixed index mark 2.

For example, when the division of photographing distance 5 m is registered to the fixed index mark 2, the automatically focusing interlocking projection 8b of the lens supporting member 8 and the actuating member 103 are not engaged with each other but are spaced apart by a certain distance (corresponding to the amount of movement of the lens supporting member 8 from infinity to 5 m) and therefore, automatic focusing cannot take place for from infinity to 5 m while automatic focusing can take place for from the photographing distance 5 m to the shortest photographing distance.

Such a usage is suited for the automatic focusing during flashlight photography using an electronic flash. That is, the photographing distance is limited within a predetermined range by the guide number of the electronic flash and so, the distance for which the automatic focusing can take place should preferably be limited within such range. It is for preventing the focus from being coincident with any object beyond such range.

In the above-described embodiment, the automatic focus position AF is provided at the location of the infinity distance mark ∞ of the distance scale 6, but it is also possible to provide this mark AF at the location of the shortest photographing distance figure and to cause the actuating member 103 to rightwardly move the supporting member 8 in accordance with the output of the automatically focusing device 102 to thereby accomplish the automatic focusing. Such a construction may result in the following advantage. When objects lie at a long distance and at a short distance in the same picture plane and where it is desired to focus the lens to the object at the long distance, the distance scale 6 is set to a distance intermediate the short object distance and the long object distance. By this, the objective lens can be automatically focused only to the objects at from the set distance to the infinity distance, whereby the lens can be automatically focused to the object at the long distance.

Figure 2:
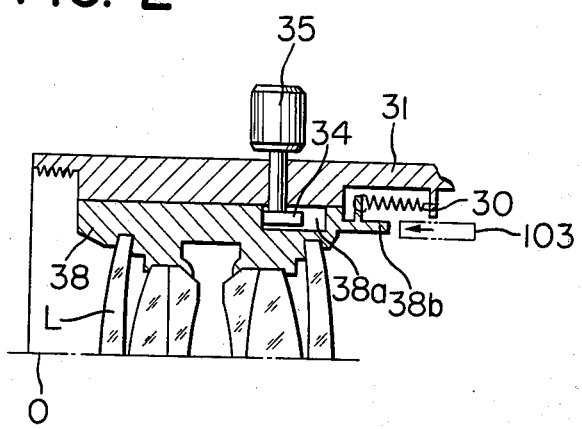
FIGS. 2 to 5 are cross-sectional views of essential portions of second to fifth embodiments of the present invention.

FIG. 2 shows a second embodiment of the present invention in which the manually focusing member comprises a knob 35 rotatably mounted on a fixed portion 31 and an eccentric cam 34 integrally formed with the knob 35. A lens supporting member 38 supports a focusing lens L and is supported from sliding movement in the direction of the optic axis by the fixing portion 31. The eccentric cam 34 is fitted in a guide groove 38a provided in the outer periphery of the lens supporting member 38. A spring 30 is stretched between the fixing portion 31 and the lens supporting means 38 to rightwardly bias the lens supporting member 38. By this, the cam surface of the eccentric cam 34 bears against the left wall surface of the guide groove 38a. Although not shown, an index mark is provided on the knob 35 and a distance scale and an automatic focus position mark are provided on the fixing portion 31.

Thus, in the case of the manually focusing operation, the knob 35 may suitably be revolved on its axis to cause the eccentric cam 34 to move the lens supporting member 38 in the direction of the optic axis.

In the case of the automatically focusing operation, the index mark on the knob 35 is registered to the automatic focus position mark to bring about the position as shown in FIG. 2. At this time, the distance between the right wall surface of the guide groove 38a on the lens supporting member 38 and the opposed cam surface of the eccentric cam 34 is enough or more to permit the lens supporting member 38 to be moved from the infinity position to the shortest photographing position.

Thus, the automatic focusing can be accomplished by the actuating member 103 moving the lens supporting member 38 in the direction of the optical axis as already described.

Figure 3:
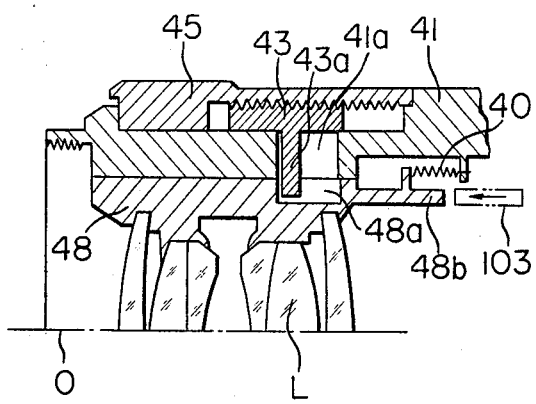

FIG. 3 shows a third embodiment of the present invention. A fixing portion 41 is formed with a translation guide groove 41a extending in the direction of the optic axis 0. A manually focusing ring 45 is rotatably supported on the outer periphery of the fixing portion 41. A single helicoid ring 43 has on the outer periphery thereof a helicoid meshing with the helocoid of a manually focusing ring 45 and on the inner periphery a projecting portion 43a extending through the guide groove 41a into the inner periphery of the fixing portion 41. Thus, by rotation of the operating ring 45, the helicoid ring 43 slides on the fixing portion 41 in the direction of the optic axis.

A focusing lens supporting member 48 is supported within the fixing portion 41 for sliding movement in the direction of the optic axis, and the outer periphery thereof is formed with a connecting groove 48a in which the projecting portion 43a is fitted. A spring 40 is stretched between the fixing portion 41 and the focusing lens supporting member 48 and acts to cause engagement between the projecting portion 43a and one end of the connecting groove 48a. An automatically focusing interlocking projection 48b is operatively associated with the actuating member 103 of the automatically focusing device.

Now, in the case of the manually focusing operation, if the manually focusing ring 45 is turned, the single helicoid ring 43 is caused to slide in the direction of the optic axis by the projecting portion 43a thereof being guided by the guide groove 41a in response thereto. On the other hand, the lens supporting member 48 is operatively associated with the projecting portion 43a by the action of the spring 40 and therefore, the lens supporting member 48 assumes a position corresponding to any desired photographing distance in response to rotation of the manually focusing ring 45.

Next, in the case of the automatically focusing operation, the automatic focus position mark is brought into opposed relationship with the fixed index mark in the same manner as already described, to thereby bring about the position as shown in FIG. 3. In this position, the distance between the projecting portion 43a and the other end of the connecting groove 48a is enough to move the lens supporting member 48 from the infinity to the shortest photographing postion and therefore, as already described, the actuating member 103 engages the projection 48b to move the lens supporting member 48 in the direction of the optic axis, thereby enabling the automatic focusing to be accomplished.

Figure 4:
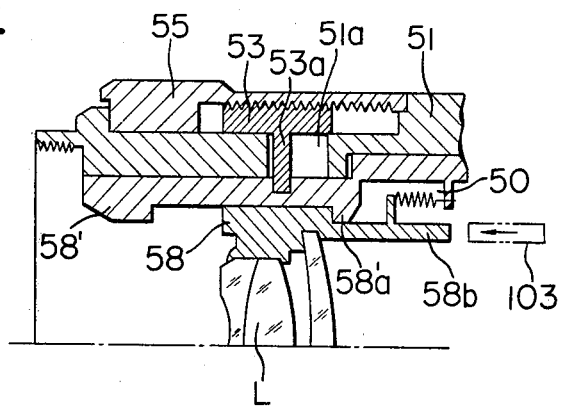

FIG. 4 shows a fourth embodiment of the present invention. In this embodiment, an intermediate sliding member 58' is interposed between a focusing lens supporting member 58 and a single helicoid ring 53 and this intermediate member 58' is made integral with the projecting portion 53a of the single helicoid ring 53. The focusing lens supporting member 58 is supported by the intermediate member 58' for sliding movement in the direction of the optic axis, and may be coupled to a connecting end portion 58'a of the member 58' by a spring 50 stretched between the intermediate member 58' and the focusing lens supporting member 58. A fixing portion 51 and a manually focusing ring 55 are the same as those shown in FIG. 3.

Thus, the manually focusing operation may be accomplished by the intermediate member 58' coupled to the focusing lens supporting member 58 being operatively associated with the manually focusing ring 55 through the single helicoid ring 53.

The automatically focusing operation may be accomplished by registering the automatic focus position mark to the fixed index mark, bringing the lens structure into the position of FIG. 4 and causing the actuating member 103 to engage the automatically interlocking projection 58b to leftwardly slide the focusing lens supporting member 58 against the force of the spring 50.

In the embodiments of FIGS. 1 and 4, the springs 10 and 50 are respectively connected between the members 4, 58' operatively associated with the manually focusing ring 5, 50 and the lens supporting members 8, 58 and so, during the manually focusing operation, the force of the springs 10 and 50 are always constant and this leads to an advantage that the manually focusing operating force can be made constant for from the object at infinity to the object at the close-up distance.

Figure 5:
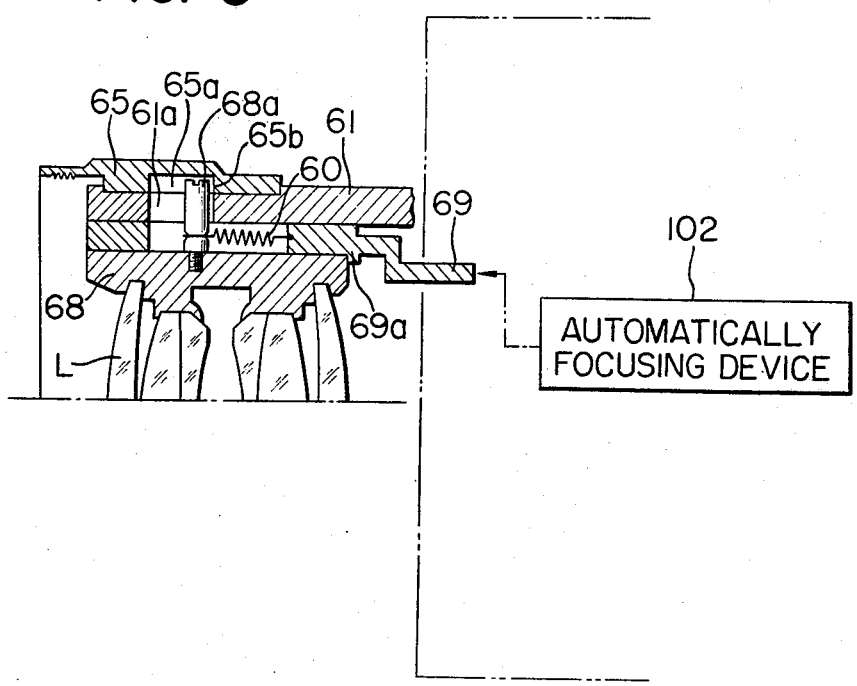

Referring to FIG. 5 which shows a fifth embodiment of the present invention, a pin 68a secured to a focusing lens supporting member 68 is inserted into a through-hole 61a of the fixing portion 61 of the lens structure and into the cam groove 65a of a manually focusing rotating ring 65. This through-hole 61a extends in the direction of the optic axis and prevents rotation of the pin 68a about the optic axis. The cam groove 65a of the operating ring 65 extends obliquely leftwardly in the circumferential direction of the operating ring 65 and the width of the groove, namely, the length of the groove in the direction of the optic axis, is sufficient to permit the pin 68a to be moved from the infinity position to the shortest photographing position. An intermediate member 69 slidable in the direction of the optic axis is connected to the automatically focusing device 102 and may be driven in the direction of the optic axis by the output thereof. A spring 60 is connected between the intermediate member 69 and the pin 68a.

With such a construction, where the automatic focusing is to be effected, the automatically focusing device 102 is actuated to leftwardly move the intermediate member 69, whereupon the engagement between the projection 69a of the intermediate member 69 and the lens supporting member 68 causes the latter to slide leftwardly, and as the intermediate member 69 is rightwardly moved by the device 102, the lens supporting member 68 is caused to slide in the same direction by the spring 60 and the pin 68a. On the other hand, where the manually focusing operation is to be effected, the pin 68a and accordingly, the supporting member 68 is forced to leftwardly move against the force of the spring 60 by the cam surface 65b of the cam groove 65a upon rotation of the manually focusing ring 65. If the operating ring 65 is turned in the opposite direction, the pin 68a is rightwardly moved while maintaining its contact with the cam surface 65b with the aid of the force of the spring 60. In this embodiment, there is an advantage that a constant force is only required for the automatically focusing device 102 to move the supporting member 68 from its infinity position to its shortest photographing position.

The foregoing embodiments have been described with respect to an example in which the entire objective lens system is moved during the focusing, but of course, the present invention is also applicable to an objective lens system of the type in which only a part of the objective lens system is movable for focusing and in such case, the focusing lens supporting member 8, 38, 48, 58, 68 moves only the part of the system.

I claim:

1. A camera which permits automatic focusing and manual focusing, comprising:
   (1) an objective lens structure including:
      (a) a focusing lens system;
      (b) a focusing lens system supporting member for supporting said focusing lens system;
      (c) biasing means for biasing said lens system supporting member in one direction of the optic axis of said focusing lens system; and
      (d) an externally operable, manual focusing operating member for moving said lens system supporting member in said one direction through said biasing means and for directly moving said lens system supporting member in the opposite direction;
   (2) an automatic focusing device; and
   (3) actuating means for moving said lens system supporting member in the direction of the optic axis against the biasing force of said biasing means by the output of said automatic focusing device, independently of said manual focusing operating member.

2. A camera according to claim 1, wherein said biasing means is spring means connected between said lens system supporting member and said manual focusing operating member, and said manual focusing operating member has a bearing portion adapted to bear against said lens system supporting member to move said supporting member in said opposite direction.

3. A camera according to claim 2, wherein said manual focusing operating member has a focusing ring rotatable about the optic axis of said focusing lens system and an intermediate member slidable in the direction of the optic axis upon rotation of said focusing ring, said spring means is connected between said intermediate member and said lens system supporting member, and said bearing portion is provided on said intermediate member.

4. A camera according to claim 2, wherein said spring means biases said bearing portion and said lens supporting member so as to ensure said bearing portion to bear against said lens supporting member, and said actuating means moves said lens supporting member away from said bearing portion.

5. A camera according to claim 1, wherein said biasing means is spring means connected between the fixing portion of said objective lens structure and said lens system supporting member.

6. A camera according to claim 5, wherein said manual focusing operating member has a rotatable knob and a cam connected to said knob, said cam being effective to move said lens system supporting member in the direction of the optic axis upon rotation of said knob.

7. A camera which permits automatic focusing and manual focusing, comprising:
   (1) a focusing lens system;
   (2) a supporting member for supporting said focusing lens system;
   (3) biasing means for biasing said supporting member in one direction of the optical axis of said focusing lens system;
   (4) an externally accessible, manual focusing operating member for moving said supporting member in said one direction through said biasing means and for directly moving said supporting member in the opposite direction;
   (5) an automatic focusing device; and
   (6) means connected to said automatic focusing device and slid thereby in the direction of the optic axis, said slide means moving said supporting member in the opposite direction when said slide means is slid in the same direction by said automatic focusing device, and moving said supporting member in said one direction through said biasing means when said slide means is slid in said one direction by said automatic focusing means.

8. A camera according to claim 7, wherein said biasing means is spring means connected between said supporting member and said slide means.

9. An objective lens structure for a camera which has an automatic focusing device, said objective lens structure comprising:
   a focusing lens system;
   a supporting member for supporting said focusing lens system;
   biasing means for biasing said supporting member in one direction of the optical axis of said focusing lens system; and
   an externally accessible, manual focusing operating member for moving said supporting member is said one direction through said biasing menas and for directly moving said supporting member in the opposite direction, said supporting member being moved in the direction of the optical axis against the biasing force of said biasing means by the output of said automatic focusing device, independently of said manual focusing operating member.

* * * * *